US012719049B2

(12) United States Patent
Anglin

(10) Patent No.: US 12,719,049 B2
(45) Date of Patent: Aug. 25, 2026

(54) PHOSPHATE BASED SURFACTANTS FOR ALKALINE BATTERY ANODE

(71) Applicant: DURACELL U.S. OPERATIONS, INC., Wilmington, DE (US)

(72) Inventor: David Lloyd Anglin, Brookfield, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 594 days.

(21) Appl. No.: 18/329,566

(22) Filed: Jun. 5, 2023

(65) Prior Publication Data

US 2023/0395790 A1 Dec. 7, 2023

Related U.S. Application Data

(60) Provisional application No. 63/348,867, filed on Jun. 3, 2022.

(51) Int. Cl.

| | |
|---|---|
| ***H01M 4/42*** | (2006.01) |
| ***H01M 4/02*** | (2006.01) |
| ***H01M 4/505*** | (2010.01) |
| ***H01M 4/525*** | (2010.01) |
| ***H01M 10/26*** | (2006.01) |

(52) U.S. Cl.

CPC ............ *H01M 4/42* (2013.01); *H01M 4/505* (2013.01); *H01M 4/525* (2013.01); *H01M 10/26* (2013.01); *H01M 2004/027* (2013.01); *H01M 2004/028* (2013.01)

(58) Field of Classification Search

None

See application file for complete search history.

(56) References Cited

U.S. PATENT DOCUMENTS

| | | | |
|---|---|---|---|
| 3,562,168 | A | 2/1971 | Wetmore et al. |
| 4,195,120 | A | 3/1980 | Rossler et al. |
| 5,342,712 | A | 8/1994 | Mieczkowska et al. |

(Continued)

FOREIGN PATENT DOCUMENTS

| | | | |
|---|---|---|---|
| EP | 1962357 | A1 | 8/2008 |
| EP | 3540837 | A1 | 9/2019 |

(Continued)

OTHER PUBLICATIONS

International Application No. PCT/US2023/024498, International Search Report and Written Opinion, mailed Sep. 19, 2023.

(Continued)

*Primary Examiner* — Scott J. Chmielecki

(74) *Attorney, Agent, or Firm* — MARSHALL, GERSTEIN & BORUN LLP

(57) ABSTRACT

An anode composition, an alkali battery, a method of making a battery anode, and a method of making a battery, wherein the anode comprises a zinc or zinc alloy and a surfactant of formula (I):

wherein R1 is selected from aryl and C1-C12 alkyl; x is an integer from 2 to 30; n is an integer from 2 to 6; and y is 1 or 2.

19 Claims, 3 Drawing Sheets

(56) References Cited

U.S. PATENT DOCUMENTS

| | | | | |
|---|---|---|---|---|
| 5,378,559 | A | 1/1995 | Randell et al. | |
| 5,401,590 | A | 3/1995 | Chalilpoyil et al. | |
| 5,698,315 | A | 12/1997 | Hayashi et al. | |
| 5,919,598 | A | 7/1999 | Flaim et al. | |
| 5,997,775 | A | 12/1999 | Hayashi et al. | |
| 7,351,499 | B2 | 4/2008 | Iltchev et al. | |
| 2004/0237293 | A1 | 12/2004 | Durkot et al. | |
| 2009/0053604 | A1 | 2/2009 | Kato et al. | |
| 2019/0288346 | A1* | 9/2019 | Liu | H01M 10/26 |

FOREIGN PATENT DOCUMENTS

| | | | |
|---|---|---|---|
| JP | H06338318 | A | 12/1994 |
| WO | WO-2008013115 | A1 | 1/2008 |
| WO | WO-2019/100006 | A1 | 5/2019 |

OTHER PUBLICATIONS

U.S. Environmental Protection Agency, "Design for the Environment Program. DfE Alternatives Assessment for Nonylphenol Ethoxylates." May 2012. https://www.epa.gov/sites/default/files/2014-06/documents/npe_final.pdf Accessed May 16, 2022.

Faegh et al. "Understanding the Dynamics of Primary Zn—MnO2 Alkaline Battery Gassing with Operando Visualization and Pressure Cells," J. Electrochemical Soc., 165(11):A2528-A2535 (2018).

* cited by examiner

PHOSPHATE BASED SURFACTANTS FOR ALKALINE BATTERY ANODE

CROSS REFERENCE TO RELATED APPLICATION

This application claims the benefit under 35 U.S.C. § 119(e) of U.S. provisional patent application Ser. No. 63/348,867, filed Jun. 3, 2022, the entire disclosure of which is incorporated herein by reference.

FIELD OF THE DISCLOSURE

The disclosure relates to phosphate based surfactants for an alkaline battery anode and anodes and batteries comprising same.

BACKGROUND OF THE DISCLOSURE

Electrochemical cells, or batteries, are commonly used as electrical energy sources. A battery contains a negative electrode, typically called the anode, and a positive electrode, typically called the cathode. The anode contains an electrochemically active anode material that can be oxidized. The cathode contains an electrochemically active cathode material that can be reduced. The electrochemically active anode material is capable of reducing the electrochemically active cathode material. A separator is disposed between the anode and the cathode, and an ionically conductive electrolyte solution is in intimate contact with the cathode, the anode, and the separator. The battery components are disposed in a can, or housing, that is typically made from metal.

When a battery is used as an electrical energy source in an electronic device, electrical contact is made to the anode and the cathode, allowing electrons to flow through the device and permitting the respective oxidation and reduction reactions to occur to provide electrical power to the electronic device. The electrolyte contains ions that flow through the separator between the anode and cathode to maintain charge balance throughout the battery during discharge.

There is a growing need to make batteries that are better suited to power contemporary electronic devices such as toys; remote controls; audio devices; flashlights; digital cameras and peripheral photography equipment; electronic games; toothbrushes; radios; and clocks. To meet this need, batteries may include higher loading of electrochemically active anode and/or cathode materials to provide increased capacity and service life. Batteries, however, also come in common sizes, such as the AA, AAA, AAAA, C, and D battery sizes, that have fixed external dimensions and constrained internal volumes. The ability to increase electrochemically active material loading alone to achieve better performing batteries is thus limited.

The composition of the anode may be adjusted in order to provide increased performance. For example, a surfactant can be included in the anode composition to create a protective layer around the zinc particles to inhibit a zinc corrosion reaction and the formation of hydrogen gas that can occur when the cell comprising the anode is at rest. The surfactant can adhere to the surfaces of the zinc anode particles, inhibiting hydroxide ions or water from approaching the zinc particles, thereby suppressing the corrosion of the zinc and the formation of hydrogen gas (reactions (I) and (II)) from taking place on the surfaces of the zinc particles.

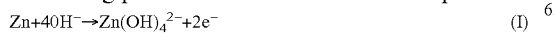

$$Zn+4OH^- \rightarrow Zn(OH)_4^{2-}+2e^- \quad (I)$$

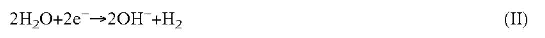

$$2H_2O+2e^- \rightarrow 2OH^-+H_2 \quad (II)$$

Phosphate ester based surfactants, including polyoxyethylene dinonylphenyl ether phosphate, are commonly used in battery anode compositions; however, this commonly used phosphate ester material includes a nonylphenol functional group, which is regulated in some countries due to health and environmental concerns. Surfactants that inhibit the zinc corrosion reaction and accompanying formation of hydrogen gas and do not contain nonylphenol functional groups are thus desirable.

SUMMARY OF THE DISCLOSURE

One aspect of the disclosure provides an anode composition comprising a zinc or zinc alloy and a surfactant of formula (I):

(I)

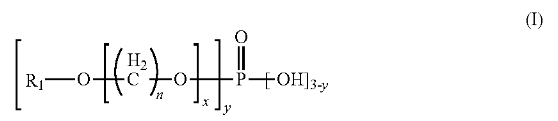

wherein R1 comprises an aryl group; x is an integer from 2 to 30; n is an integer from 2 to 6; and y is 1 or 2. The aryl group of the surfactant may be selected from phenyl, naphthyl, fluorenyl, anthracenyl, phenanthryl, tetracenyl, benz[a]anthracenyl, pyrenyl, perylenyl, and biphenyl.

Another aspect of the disclosure provides an anode composition comprising a zinc or zinc alloy and a surfactant of formula (II):

(II)

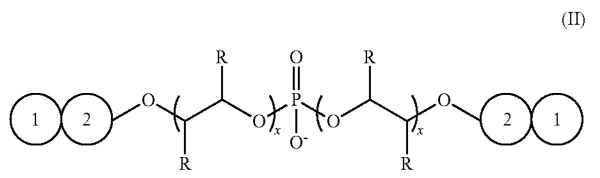

wherein R is methyl or hydrogen; x is an integer from 2 to 30, and the rings 1 and 2 represent a coupled ring system comprising at least 10 ring carbons. The coupled ring system may be naphthyl, fluorenyl, anthracenyl, phenanthryl, tetracenyl, benz[a]anthracenyl, pyrenyl, perylenyl, biphenyl, or bicyclohexyl.

Another aspect of the disclosure provides an alkaline battery comprising an electrochemically active anode comprising a zinc or zinc alloy and a surfactant of formula (I):

(I)

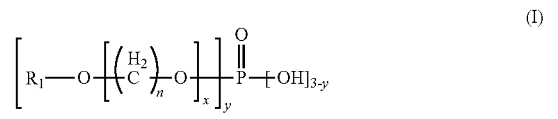

wherein R1 comprises an aryl group; x is an integer from 2 to 30; n is an integer from 2 to 6; and y is 1 or 2. The aryl group of the surfactant may be selected from phenyl, naphthyl, fluorenyl, anthracenyl, phenanthryl, tetracenyl, benz[a]anthracenyl, pyrenyl, and perylenyl.

Yet another aspect of the disclosure provides an alkaline battery comprising an electrochemically active anode comprising a zinc or zinc alloy and a surfactant of formula (II).

(II)

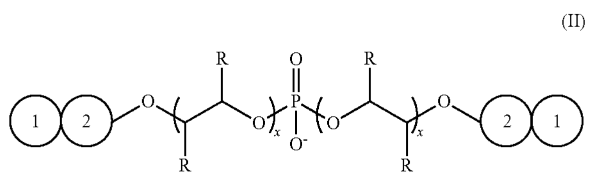

wherein R is methyl or hydrogen; x is an integer from 2 to 30, and the rings 1 and 2 represent a coupled ring system comprising at least 10 ring carbons. The coupled ring system may be naphthyl, fluorenyl, anthracenyl, phenanthryl, tetracenyl, benz[a]anthracenyl, pyrenyl, perylenyl, biphenyl, or bicyclohexyl.

An additional aspect of the disclosure provides a method of making a battery anode comprising, admixing a zinc or zinc alloy with a surfactant of formula (I):

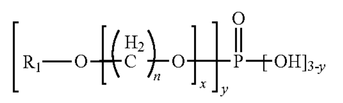

wherein R1 comprises an aryl group; x is an integer from 2 to 30; n is an integer from 2 to 6; and y is 1 or 2. The aryl group of the surfactant may be selected from phenyl, naphthyl, fluorenyl, anthracenyl, phenanthryl, tetracenyl, benz[a] anthracenyl, pyrenyl, and perylenyl.

An additional aspect of the disclosure provides a method of making a battery anode comprising, admixing a zinc or zinc alloy with a surfactant of formula (II):

(II)

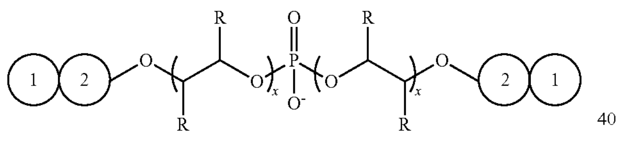

wherein R is methyl or hydrogen; x is an integer from 2 to 30, and the rings 1 and 2 represent a coupled ring system comprising at least 10 ring carbons. The coupled ring system may be naphthyl, fluorenyl, anthracenyl, phenanthryl, tetracenyl, benz[a]anthracenyl, pyrenyl, perylenyl, biphenyl, or bicyclohexyl.

Yet another aspect of the disclosure provides a method of making a battery, comprising incorporating into a battery an anode including a zinc or zinc alloy and a surfactant of formula (I):

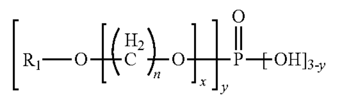

wherein R1 comprises an aryl group; x is an integer from 2 to 30; n is an integer from 2 to 6; and y is 1 or 2. The aryl group of the surfactant may be selected from phenyl, naphthyl, fluorenyl, anthracenyl, phenanthryl, tetracenyl, benz[a] anthracenyl, pyrenyl, and perylenyl.

In a further aspect, the disclosure provides a method of making a battery, the method comprising incorporating into a battery an anode including a zinc or zinc alloy and a surfactant of formula (II):

(II)

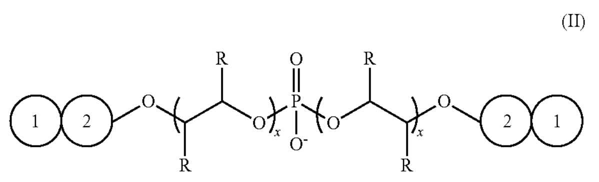

wherein R is methyl or hydrogen; x is an integer from 2 to 30, and the rings 1 and 2 represent a coupled ring system comprising at least 10 ring carbons. The coupled ring system may be naphthyl, fluorenyl, anthracenyl, phenanthryl, tetracenyl, benz[a]anthracenyl, pyrenyl, perylenyl, biphenyl, or bicyclohexyl.

Further aspects and advantages will be apparent to those of ordinary skill in the art from a review of the following detailed description. While the compositions and methods are susceptible of embodiments in various forms, the description hereafter includes specific embodiments with the understanding that the disclosure is illustrative, and is not intended to limit the disclosure to the specific embodiments described herein.

BRIEF DESCRIPTION OF THE DRAWINGS

While the specification concludes with claims particularly pointing out and distinctly claiming the subject matter, which are regarded as forming the present invention, the invention will be better understood from the following description taken in conjunction with the accompanying drawing.

DETAILED DESCRIPTION

The disclosure provides an anode composition, an alkali battery, a method of making a battery anode, and a method of making a battery, wherein the anode comprises a zinc or zinc alloy and a surfactant of formula (I):

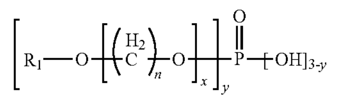

wherein R1 comprises an aryl group; x is an integer from 2 to 30; n is an integer from 2 to 6; and y is 1 or 2. The aryl group of the surfactant may be selected from phenyl, naphthyl, fluorenyl, anthracenyl, phenanthryl, tetracenyl, benz[a] anthracenyl, pyrenyl, and perylenyl. The aryl group may optionally be further substituted with one or more substituents, particularly substituents that increase solubility in aqueous solutions.

Another aspect of the disclosure provides an anode composition comprising a zinc or zinc alloy and a surfactant of formula (II):

(II)

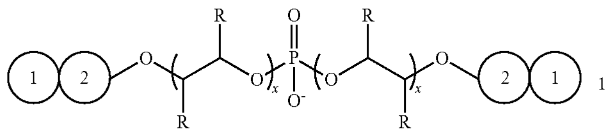

wherein R is methyl or hydrogen; x is an integer from 2 to 30, and the rings 1 and 2 represent a coupled ring system comprising at least 10 ring carbons. Non-limiting examples of a coupled ring system include fused cyclohexyl rings and fused benzene rings, but other rings may be used. The coupled ring system may be naphthyl, fluorenyl, anthracenyl, phenanthryl, tetracenyl, benz[a]anthracenyl, pyrenyl, perylenyl, biphenyl, or bicyclohexyl. The coupled ring system may optionally be further substituted with one or more substituents, particularly substituents that increase solubility in aqueous solutions.

Anodes of the disclosure and batteries comprising anodes of the disclosure advantageously provide one or more benefits, for example, providing a zinc anode comprising zinc particles and having a protective surfactant layer around the zinc particles that inhibits both the zinc corrosion reaction and generation of hydrogen gas and/or providing a battery having good discharge capacity, advantageously without including a nonylphenol functional group.

Figure 1:
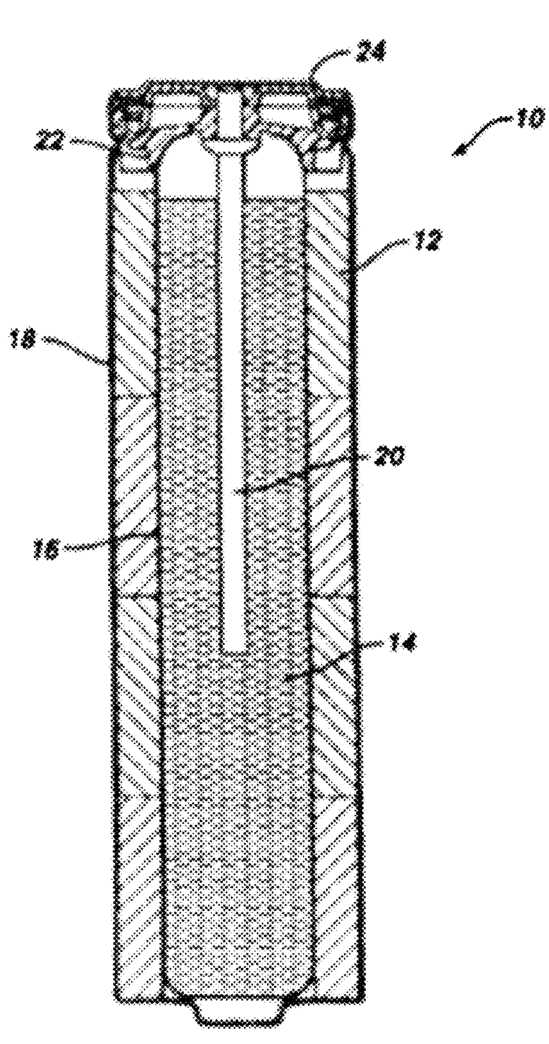
FIG. 1 is a side-sectional view of one embodiment of a battery comprising an anode including a surfactant according to the invention.

Referring to FIG. 1, a battery 10 according to the present invention includes a cathode 12, an anode 14, a separator 16, and a cylindrical housing 18. Battery 10 also includes a current collector 20, a seal 22, and a negative metal top cap 24, which serves as the negative terminal for the battery. Cathode 12 is in contact with housing 18, and the positive terminal of battery 10 is at the opposite end of the battery from the negative terminal. An alkaline electrolyte is dispersed throughout battery 10. Battery 10 can be, for example, an AA, AAA, AAAA, C, or D battery. While battery 10 can be cylindrical, in some embodiments, battery 10 can be non-cylindrical. For example, battery 10 can be a coin cell, a button cell, or a wafer cell. In some embodiments, a battery can be prismatic. In some embodiments, a battery can have a rigid laminar cell configuration or be provided in a flexible pouch, envelope, or bag cell configuration. In some embodiments, a battery can have a spirally wound jelly-roll configuration, or a flat plate configuration. Suitable batteries are described, for example, in U.S. Pat. Nos. 6,783,893; 7,435,395, and U.S. Patent Application Publication No. 2007/0248879.

Anode

Anode 14 can be, for example, a zinc gel that includes zinc metal particles, one or more gelling agents, one or more surfactants, and optionally minor amounts of additives. In addition, a portion of the electrolyte solution is dispersed throughout the anode. The zinc metal particles may comprise zinc (elemental metal). The zinc metal particles may be alloys of zinc and further comprise one or more metals, for example, chosen from one or more in the group of aluminum, bismuth, calcium, gallium, indium, lithium, magnesium, lead, and tin. Zinc metal particles can have a size in a range of 45 to 350 μm and a median particle diameter in a range of 80 to 255 μm as determined by CCD imaging measurements. Zinc metal particles commonly referred to as "fines" having a size of 44 microns or less can be included to increase the surface area of the zinc in the anode. Zinc fines can be included in amounts of about 1 wt. % to about 30 wt. %, about 5 wt. % to about 30 wt. %, about 10 wt. % to about 25 wt. %, for example, about 5 wt. %, about 10 wt. %, about 15 wt. %, about 20 wt. %, about 25 wt. %, or about 30 wt. %, based on the total weight of the zinc metal particles.

The term "about" is used according to its ordinary meaning, for example, to mean approximately or around. In one embodiment, the term "about" means±10% of a stated value or range of values. In another embodiment, the term "about" means±5% of a stated value or range of values. A value or range described in combination with the term "about" expressly includes the specific value and/or range as well (e.g., for a value described as "about 40," "40" is also expressly contemplated). Further, the dimensions and values disclosed herein are not to be understood as being strictly limited to the exact numerical values recited. Instead, unless otherwise specified, each such dimension is intended to mean both the recited value and a functionally equivalent range surrounding that value.

The amount of electrochemically active anode material within the anode may be referred to as the anode loading. The loading of the anode may vary depending upon the electrochemically active anode material used within, and the cell size of, the battery. For example, AA batteries with a zinc electrochemically active anode material may have an anode loading of at least about 3.3 grams of zinc metal particles, for example, at least about 4.0, about 4.3, about 4.6 grams, about 5.0 grams, or about 5.5 grams of zinc metal particles. AAA batteries, for example, with a zinc electrochemically active anode material may have an anode loading of at least about 1.9 grams of zinc metal particles, for example, at least about 2.0 or about 2.1 grams of zinc metal particles. AAAA batteries, for example, with a zinc electrochemically active anode material may have an anode loading of at least about 0.6 grams of zinc metal particles, for example, at least about 0.7 to about 1.0 grams of zinc metal particles. C batteries, for example, with a zinc electrochemically active anode material may have an anode loading of at least about 9.5 grams of zinc metal particles, for example, at least about 10.0 to about 15.0 grams of zinc metal particles. D batteries, for example, with a zinc electrochemically active anode material may have an anode loading of at least about 19.5 grams of zinc metal particles, for example, at least about 20.0 to about 30.0 grams of zinc metal particles.

The anode typically includes a gelling agent. Examples of gelling agents include polyacrylic acids, polyacrylonitrile, starch, starch derivatives, grafted starch materials (e.g., starch grafted polyacrylic acid, starch grafted polyacrylonitrile), salts of polyacrylic acids, polyacrylates, cellulosic derivatives, carboxymethylcellulose, sodium carboxymethylcellulose, a polyacrylic acid cross-linked with polyalkenyl ether of divinyl glycol; or combinations thereof. The anode may include, for example, from about 0.1% by weight to about 2% by weight gelling agent.

The surfactant of the disclosure may comprise a surfactant according to formula (I):

(I)

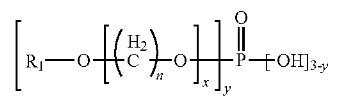

wherein R1 comprises an aryl group; x is an integer from 2 to 30; n is an integer from 2 to 6; and y is 1 or 2. The aryl group of the surfactant may be selected from phenyl, naphthyl, fluorenyl, anthracenyl, phenanthryl, tetracenyl, benz[a]anthracenyl, pyrenyl, and perylenyl. In one embodiment, R1 is 2-napthyl.

The surfactant of formula (I) is typically provided as a mixture of surfactants having formula (I). In general, y can be selected from 1 or 2. Thus, in some embodiments, the surfactant comprises a phosphate monoester (i.e., when y is 1) or a phosphate diester (i.e., when y is 2). In other embodiments, the phosphate ester surfactant comprises a mixture of phosphate monoester and phosphate diester surfactants according to formula (I). When y is 2, x and n occur twice and may be independently varied, i.e., each x may be the same or different and each n may similarly be the same or different.

In formula (I), x can be any whole number integer in the range of 2 to 30, 3 to 25, 5 to 20, 8 to 20, 10 to 18, or 12 to 16, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30. In embodiments, the surfactant of formula (I) comprises a mixture of surfactants of formula (I), and the mixture has an average x value in the range of 2 to 30, 3 to 25, 5 to 20, 8 to 20, 10 to 18, or 12 to 16, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30. In embodiments, the surfactant of formula (I) is provided as a mixture having an average x in a range of 6 to 16, 8 to 16, or 8 to 14. Without intending to be bound by theory, it is believed that as the value of x (or average value of x) decreases, the solubility of the surfactant in the electrolyte decreases. Further, without intending to be bound by theory, it is believed that as the value of x (or average value of x) increases, the solubility of the surfactant increases followed by an eventual decrease due to increased association of the chain with other surfactant molecules and/or other materials, and/or the mass of the surfactant becoming too large. Advantageously, when x is in a range of 6 to 16, 8 to 16, or 8 to 14, significantly less surfactant can be used compared to an anode including a conventional polyoxyethylene dinonylphenyl ether phosphate surfactant, while advantageously providing substantially the same performance. Because less surfactant is included, lower addition volumes are used such that additional electrochemical active anode material may be included, leading to further performance enhancement relative to an anode including a conventional polyoxyethylene dinonylphenyl ether phosphate surfactant.

In formula (I), n can be any whole number integer in the range of 2 to 6, for example, 2, 3, 4, 5, or 6. In embodiments, n is in a range of 2 to 3. For example, n can be 2 or 3. Typically, n is 2. Without intending to be bound by theory, it is believed that as the value of n increases, the solubility of the surfactant in the electrolyte decreases.

The surfactant of the disclosure may comprise a surfactant according to formula (II).

(II)

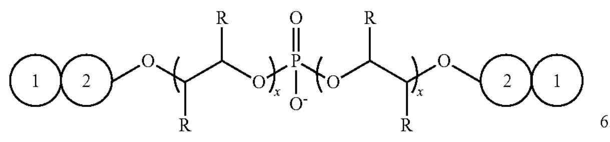

wherein R is methyl or hydrogen; x is an integer from 2 to 30, and the rings 1 and 2 represent a coupled ring system comprising at least 10 ring carbons. The coupled ring system may be naphthyl, fluorenyl, anthracenyl, phenanthryl, tetracenyl, benz[a]anthracenyl, pyrenyl, perylenyl, biphenyl, or bicyclohexyl.

The surfactant of formula (II) is typically provided as a mixture of surfactants having formula (I). In formula (II), x occurs twice and may be independently varied, i.e., each x may be the same or different.

In formula (II), x can be any whole number integer in the range of 2 to 30, 3 to 25, 5 to 20, 8 to 20, 10 to 18, or 12 to 16, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30. In embodiments, the surfactant of formula (II) comprises a mixture of surfactants of formula (II), and the mixture has an average x value in the range of 2 to 30, 3 to 25, 5 to 20, 8 to 20, 10 to 18, or 12 to 16, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30. In embodiments, the surfactant of formula (II) is provided as a mixture having an average x in a range of 6 to 16, 8 to 16, or 8 to 14. Without intending to be bound by theory, it is believed that as the value of x (or average value of x) decreases, the solubility of the surfactant in the electrolyte decreases. Further, without intending to be bound by theory, it is believed that as the value of x (or average value of x) increases, the solubility of the surfactant increases followed by an eventual decrease due to increased association of the chain with other surfactant molecules and/or other materials, and/or the mass of the surfactant becoming too large. Advantageously, when x is in a range of 12 to 16, significantly less surfactant can be used compared to an anode including a conventional polyoxyethylene dinonylphenyl ether phosphate surfactant, while advantageously providing substantially the same performance. Because less surfactant is included, lower addition volumes are used such that additional electrochemical active anode material may be included, leading to further performance enhancement relative to an anode including a conventional polyoxyethylene dinonylphenyl ether phosphate surfactant. Additionally, the addition of lower volumes of surfactant can beneficially cause less disruption of the pregel anode and thus result in higher yield stress anodes.

The surfactant according to formulae (I) and/or (II) is included in the anode composition to create a protective layer around the zinc particles to inhibit a zinc corrosion reaction, but must be able to dissociate from the surface of the zinc particles to allow for the discharge reaction to proceed. The surfactant according to formulae (I) and/or (II) can be included in the anode composition in an amount in a range of between about 10 ppm to about 75 ppm, about 10 ppm to about 65 ppm, about 10 ppm to about 55 ppm, about 10 ppm to about 50 ppm, about 20 ppm to about 50 ppm, or about 20 ppm to about 45 ppm, relative to the amount of zinc in the anode composition, for example, about 10 ppm, about 15 ppm, about 20 ppm, about 25 ppm, about 30 ppm, about 35 ppm, about 40 ppm, about 45 ppm, or about 50 ppm relative to the amount of zinc metal particles in the anode composition. The amount of surfactant according to formulae (I) and/or (II) is provided in terms of parts per million relative to the amount of zinc metal particles. Accordingly, for every one million weight parts of zinc metal particles, there is, for example, 10 to 75 weight parts surfactant according to formulae (I) and/or (II). The surfactant according to formulae (I) and/or (II) can be diluted to 1% in a 0.05 M alkali hydroxide, e.g., KOH, solution to allow for more accurate amount addition to the anode composition. Without intending to be bound by theory, it is believed that as the level of surfactant increases relative to the amount of zinc metal particles in the anode, the surface passivation of the zinc anode increases. Thus, more energy will be required to remove the surfactant molecule from the zinc metal particle surface to allow the discharge reaction to proceed. Without intending to be bound by theory, it is believed that the increase in surface passivation can be due to too thick of a surfactant monolayer on the surface of the anode, the formation of a multilayered surfactant micelle on the surface of the anode, or a combination thereof. Advantageously, as demonstrated in the examples provided below, the surfactants according to formulae (I) and/or (II) can provide suitable surface coverage of the zinc anode using less surfactant than typical commercial surfactants, thereby requiring less energy to remove the surfactant from the anode surface to allow the discharge reaction to proceed. Of course, the surfactant can also be used at higher levels, as well.

Advantageously, the surfactants according to formula (I) and (II) are free of nonylphenol functional groups. As used herein, "free of nonylphenol functional groups" means that the surfactant does not contain a nonylphenol functional group and/or that the anode composition including the surfactant also does not contain significant amounts of surfactants having a nonylphenol functional group. Thus, incidental or background quantity of surfactants having a nonylphenol functional group (e.g., less than about 100 ppb) may be present in the surfactant and/or anode composition and be within the scope of the disclosure.

Additionally, the rate of surfactant coverage of the zinc particles by the surfactant can play a role in performance decay of a battery comprising same. Without intending to be bound by theory, it is believed that the more quickly the surfactant can reach maximum surface coverage of the zinc metal particles of the anode, the less performance capacity decay is demonstrated by a battery comprising said anode because the time that the zinc metal particles are directly exposed to the electrolyte is minimized. Battery performance capacity can be measured using various known techniques, including but not limited to those described below.

Electrolyte

The electrolyte may be dispersed throughout the cathode, the anode and the separator. The electrolyte comprises an ionically conductive component in an aqueous solution. The ionically conductive component may be a hydroxide. The hydroxide may be, for example, sodium hydroxide, potassium hydroxide, lithium hydroxide, cesium hydroxide, or a mixture thereof. The ionically conductive component may also further include a salt. The salt may be, for example, zinc chloride, ammonium chloride, magnesium perchlorate, magnesium bromide, and mixtures thereof. The concentration of the ionically conductive component may be selected depending on the battery design and its desired performance. An aqueous alkaline electrolyte may include a hydroxide, as the ionically conductive component, in a solution with water. The concentration of the hydroxide within the electrolyte may be from about 25 weight percent (wt. %) to about 35 wt. %, on a total weight basis of the electrolyte. For example, the hydroxide concentration of the electrolyte may be from about 25 wt. % to about 33 wt. %, or from about 25 wt. % to about 32 wt. %, on a total weight basis of the electrolyte.

With respect to an assembled alkaline cell, the concentration of the ionically conductive component may be determined by collecting the total amount of electrolyte from within an assembled alkaline cell, for example an AA or an AAA alkaline cell. Removing the separator, cathode, and anode components and dissolving these components within a hydrochloric solution may generally accomplish this. Hydrogen peroxide may be added in a drop-wise manner to aid in the dissolving process. The dissolved solution may then be diluted to a specific volume to provide an analyte. The analyte may then be analyzed via an inductively coupled plasma (ICP) emission spectrometer, such as a JY Ultratrace or its equivalent, to determine the total positive ion concentration of the ionically conductive component within the analyte, for example potassium ($K+$) concentration in ppm. The total positive ion concentration determined via ICP from the analyte may be used to mathematically determine the total weight of the positive ion, for example potassium ($K+$) in grams, and subsequently the total weight of ionically conductive component, for example potassium hydroxide (KOH) in grams, within the electrolyte solution of the sampled alkaline cell. The concentration of the ionically conductive component of the electrolyte, for example potassium hydroxide (KOH), on a weight basis of the electrolyte may be determined by dividing the total weight of the ionically conductive component by the analyte weight.

The aqueous alkaline electrolyte may also include zinc oxide (ZnO). The ZnO may serve to suppress zinc corrosion within the anode. The concentration of ZnO included within the electrolyte may be less than about 3% by weight of the electrolyte. The ZnO concentration, for example, may be less than about 2% by weight of the electrolyte.

In embodiments, the total weight of the aqueous alkaline electrolyte within an AA alkaline battery, for example, may be from about 3.0 grams to about 4.0 grams, for example, from about 3.3 grams to about 3.8 grams, or from about 3.4 grams to about 3.6 grams. In embodiments, the total weight of the aqueous alkaline electrolyte within an AAA alkaline battery, for example, may be from about 1.0 grams to about 2.0 grams, for example, from about 1.2 grams to about 1.8 grams, or from about 1.4 grams to about 1.6 grams. While the foregoing amounts are intended to be useful, a person having ordinary skill in the art is readily able to determine an appropriate weight of aqueous alkaline electrolyte needed for other battery sizes, types, and configurations.

Cathode

Cathode 12 can includes electrochemically active cathode material, carbon particles, and optionally a binder. The electrolyte solution also is dispersed through cathode 12. The weight percentages provided above and below are determined after the electrolyte solution has been dispersed.

The electrochemically active cathode material can include one or more manganese oxides, for example, the electrochemically active cathode material can include one or more manganese dioxides chosen from one or more in the group of electrolytic manganese dioxide (EMD), chemical manganese dioxide (CMD), high power electrolytic manganese dioxide (HP EMD), lambda manganese dioxide, gamma manganese dioxide, and beta manganese dioxide. Other suitable electrochemically active cathode materials may be used including, but not limited to, silver oxide, nickel oxide, silver nickel oxide, nickel oxyhydroxide, copper oxide, silver copper oxide, bismuth oxide, high-valence nickel, alloys thereof, and mixtures thereof. The nickel oxide can include nickel hydroxide, nickel oxyhydroxide, cobalt oxyhydroxide-coated nickel oxyhydroxide, delithiated layered lithium nickel oxide, partially delithiated layered lithium nickel oxide, and combinations thereof. The nickel oxyhydroxide can include beta-nickel oxyhydroxide, gamma-nickel oxyhydroxide, intergrowths of beta-nickel oxyhydroxide, gamma-nickel oxyhydroxide, cobalt oxyhydroxide-coated nickel oxyhydroxide, and mixtures thereof. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, cobalt oxyhydroxide-coated intergrowths of beta-nickel oxyhydroxide and gamma-nickel oxyhydroxide, and mixtures thereof. The nickel oxide can include a partially delithiated layered nickel oxide having the general chemical formula $Li_{1-x}H_yNiO_2$, wherein 0.1<x<0.9 and 0.1<y<0.9. The nickel oxide can include a partially delithiated layered nickel oxide having the general chemical formula $A_xH_yNi_{1+a+z}M_zO2$, wherein A comprises an alkali metal; 0.08≤x<0.2; 0≤y<0.3; 0.02≤a≤0.2; M comprises a transition metal or a main group metal, and 0≤z≤0.2, as disclosed in US-2018-0331361-A1, which is hereby incorporated herein by reference. The high-valence nickel may, for example, be a compound comprising tetravalent nickel, for example, a compound having a general formula $A_xA'_yNi_{1+a+z}M_zO_2 \cdot nH_2O$, wherein A comprises an alkali metal; A' comprises an alkali metal different from A; M comprises a transition metal or non-transition metal; 0.04≤x<0.2; 0.03≤v<0.2; 0.02≤a≤0.2; 0≤z<0.2; and 0<n<2, as disclosed in US-2018-0331361-A1, which is hereby incorporated herein by reference.

EMD is typically manufactured from direct electrolysis of a bath of manganese sulfate and sulfuric acid. Processes for the manufacture of EMD and its properties appear in Batteries, edited by Karl V. Kordesch, Marcel Dekker, Inc., New York, Vol. 1, (1974), p. 433-488. CMD is typically made by a process known in the art as the "Sedema process," a chemical process disclosed by U.S. Pat. No. 2,956,860 (Welsh). Battery-grade $MnO_2$ may be produced via the Sedema process by employing the reaction mixture of $MnSO_4$ and an alkali metal chlorate, for example, $NaClO_3$. Suitable manganese dioxides may be obtained from, for example, Tronox (Stamford, CT), Vibrantz Technologies (Houston, TX), Tosoh Corporation (Tokyo, Japan), Delta Manganese Ltd. (Mbombela, South Africa), and Xiangtan Electrochemical Scientific (Xiangtan, China).

Conventional battery grade manganese dioxide-containing compositions do not have a true stoichiometric formula $MnO_2$, but are better represented by the formula $MnO_x$, wherein x is typically between about 1.92 to 1.96, corresponding to a manganese valence of between about 3.84 and 3.92. Conventional EMD may typically have a value for x of about 1.95 or 1.96, corresponding to a manganese valence of 3.90 and 3.92, respectively. Conventional EMD also has a real density of between about 4.4 g/cm 3 and 4.6 g/cm 3.

The carbon particles can be any of the conventional carbon particles used in cathodes. The carbon particles can be, for example, graphite particles. The graphite can be synthetic or non-synthetic, or a blend of synthetic and non-synthetic. Suitable graphite particles can be obtained from, for example, Nacional de Grafite (Sao Paulo, Brazil), Imerys Graphite & Carbon (Bodio, Switzerland), and Superior Graphite Company (Chicago, Illinois). The cathode may include for example, between about 3% and about 7%, e.g., between about 4% and about 6.5% or about 2% to about 5%, carbon particles by weight.

Carbon particles are included in the cathode to allow the electrons to flow through the cathode. A lower level of carbon particles enables inclusion of a higher level of active material within the cathode without increasing the volume of the cell or reducing the void volume (which must be maintained at or above a certain level to prevent internal pressure from rising too high as gas is generated within the cell).

The binder is stable in the presence of the electrochemically active cathode material. The binder typically has a minimum swelling behavior in water. Minimizing the amount of swelling of the binder maximizes the amount of electrochemically active cathode material in the cathode. In embodiments, the binder has a swelling of no more than about 10%, no more than about 5%, or no more than about 3% in water. Examples of suitable binders include hydroxypropylmethylcelluloses (HPMC), polyacrylates, polyvinyl alcohols (PVOH), polyethylene powders, polyacrylamides, Portland cement, and fluorocarbon resins, such as PVDFs and PTFEs. An example of a polyethylene binder is sold under the trade name Coathylene HA-1681 (available from Axalta Coating Systems, PA). The cathode may include, for example, between about 0.1% and about 1% binder by weight. A lower binder level enables inclusion of a higher level of active material within the cathode.

Cathode 12 can include other additives. Examples of other cathode additives are described in, for example, U.S. Pat. Nos. 5,342,712; 5,698,315; 5,919,598; 5,997,775; and 7,351,499, which are hereby incorporated by reference. Cathode 12 may include, for example, from about 0.2% by weight to about 2% by weight TiO2. The cathode may also include a surfactant. The surfactants will need to be compatible with the binder so as to not adversely affect the binding capability. Examples of suitable surfactants for the cathode include but are not limited to anionic surfactants, amphoteric surfactants, and combinations thereof.

One non-limiting example of suitable surfactants for the cathode can include a diphenyl sulfonate or derivative thereof. In one embodiment, the surfactant comprises an anionic diphenyl sulfonate surfactant or a hydrocarbyl substituted derivative thereof where the hydrocarbyl group contains 1 to about 24, for example, 1 to about 12 carbon atoms. Specific examples include alkali metal alkyl diphenyl oxide disulfonates such as sodium hexyldiphenyloxide disulfonate, sodium decyldiphenyloxide disulfonate, dodecyldiphenyloxide disulfonic acid, sodium dodecyldiphenyloxide disulfonate, N-decyldiphenyloxide disulfonate, sodium n-decyldiphenyloxide disulfonate and sodium n-hexadecyldiphenyloxide disulfonate. Diphenlyoxide sulfonate surfactants are commercially available under the trade name DOWFAX™ (The Dow Chemical Company, MI) and specifically include DOWFAX™ C6L, C10L, 2AO, 2A1, 2A1-D, 2EP, 3BO, 3B2, 3B2-D, 2000, 8390, and 8390-D.

The amount of electrochemically active cathode material within the cathode may be referred to as the cathode loading. The loading of the cathode may vary depending upon the electrochemically active cathode material used within, and the cell size of, the battery. For example, AA batteries with a manganese dioxide electrochemically active cathode material may have a cathode loading of at least 10.0 grams of manganese dioxide, for example, at least about 10.5 grams of manganese dioxide, between about 10.7 grams and about 11.5 grams of manganese dioxide, between about 10.7 grams and about 11.0 grams of manganese dioxide, between about 10.8 grams and about 11.2 grams of manganese dioxide, between about 10.9 grams and about 11.5 grams of manganese dioxide. For an AAA battery, the cathode loading may be between about 4.0 grams and about 6.0 grams of manganese dioxide. For an AAAA battery, the cathode loading may be between about 2.0 grams and about 3.0 grams of manganese dioxide. For a C battery, the cathode loading may be between about 25.0 grams and about 29.0 grams of manganese dioxide. For a D battery, the cathode loading may be between about 54.0 grams and about 70.0 grams of manganese dioxide.

The cathode will have a sufficient dry density to enable good conductivity. The cathode dry density can be between about 2.0 $g/cm^2$ and 3.5 $g/cm^2$, or between about 2.4 $g/cm^2$ and 3.3 $g/cm^2$.

Separator

The separator 16 can have any of the conventional designs for battery separators. In some embodiments, the separator may comprise woven or nonwoven paper or fabric. The separator may include a layer of, for example, cellophane combined with a layer of non-woven material. The cellophane layer can be adjacent to cathode 12 or anode 14. The separator also can include an additional layer of non-woven material. The separator material may be thin. The separator, for example, may have a dry thickness of less than 150 micrometers (microns). The separator, for example, may have a dry thickness of less than 100 microns, for example, from about 70 microns to about 90 microns, or from about 70 microns to about 75 microns. The separator has a basis weight of 40 g/m 2 or less, for example, from about 15 $g/m^2$ to about 40 $g/m^2$, or from about 20 $g/m^2$ to about 30 $g/m^2$.

The battery housing 18 can be any conventional housing commonly used for primary alkaline batteries. The battery housing can be fabricated from metal, for example, nickel-plated cold-rolled steel. The housing generally includes an inner electrically-conductive metal wall and an outer electrically non-conductive material such as heat shrinkable plastic. An additional layer of conductive material can be disposed between the inner wall of the battery housing 18 and cathode 12. This layer may be disposed along the inner surface of the wall, along the circumference of cathode 12, or both. This conductive layer can be applied to the inner wall of the battery, for example, as a paint or dispersion including a carbonaceous material, a polymeric binder, and one or more solvents. The carbonaceous material can be carbon particles, for example, carbon black, partially graphitized carbon black, or graphite particles.

The anode current collector 20 passes through seal 22 extending into anode 14. Current collector 20 is made from a suitable metal, such as brass or brass-plated steel. The upper end of the current collector 20 electrically contacts the negative top cap 24. Seal 22 can be made, for example, of a thermoplastic material such as nylon.

Battery 10 can be assembled using convention methods and hermetically sealed by a mechanical crimping process.

The compositions and methods in accordance with the disclosure can be better understood in light of the following examples, which are merely intended to illustrate the compositions and methods of the disclosure and are not meant to limit the scope thereof in any way.

Performance Test Methods

Performance testing includes discharge performance testing that may be referred to as the ANSI/IEC Motor/Toys Test (Toy Test). The Toy Test protocol includes applying a constant load of 3.9 Ohms for 1 hour, resting the battery for a predetermined period, and then applying the load again. This cycle is repeated until the cutoff voltage of 0.8 volts is reached. Results are reported in service hours (or the hours during which the load is applied). In the modified protocol results shown in Example 2, the battery rests for a period of 12 hours. Typically, as performed in Example 3, a rest of 23 hours is used, but the results are typically the same with a shorter resting period. A Maccor test system was used.

Performance testing also includes discharge performance testing that may be referred to as the Digital Camera (DigiCam) Test. The Digital Camera Test is a pulse test protocol that includes discharging the battery with high and medium power pulsed discharge cycles. Each discharge cycle consists of a combination of two discharge regimes including a 1.5 Watt high power pulse for a period of 2 seconds followed immediately by a 650 mW medium power pulse for 28 seconds. This combination of discharge regimes is repeated ten times (i.e., 5 minutes total) and then the battery is allowed to rest for a period of fifty-five minutes. The combination of high and medium power discharge pulses and rest period (i.e., 1 hour/cycle) is repeated until a cutoff voltage of 1.05 volts is reached. The number of cycles required to reach the cutoff voltage is reported as "pulses" or "pictures". The number of pulses reported consists of the total number of 1.5 Watt high power pulses, which corresponds to the total number of discharge cycles. The Digicam Discharge Test is considered to be a high rate intermittent discharge test for a conventional AA battery. A Maccor test system was used.

Performance testing also includes a discharge performance test that may be referred to as 3.9 ohm Continuous Discharge Test. The 3.9 ohm Continuous Discharge Test protocol includes discharging the battery to support a constant load of 3.9 ohm until a cutoff voltage of 0.8 volts is reached. Results are reported in service hours (or the hours during which the load is applied). A Maccor test system was used.

Performance testing further includes discharge performance testing that may be referred to as a Pulse Load Voltage test. The Pulse Load Voltage test protocol includes discharging the battery at a current drain of 80 mA for one second and measuring the voltage immediately thereafter. A Maccor test system was used.

Performance testing includes discharge performance testing that may be referred to as intermittent 3.9 ohm discharge testing. Cells were discharged on a Maccor test device for 1 hour at 3.9 ohms, rested for a period of 12 hours, and then cycled again for the indicated number of pulses. The discharge curves show voltage vs. capacity and demonstrate relative differences in capacity between cells (or discharge rates). A Maccor test system was used.

EXAMPLES

Example 1

An ethoxylated naphthol phosphate was synthesized by reacting a 12:1 ratio of ethoxylated naphthol (Angene International Limited, Nanjing, China) and phosphorus pentoxide (P2O5) stirring in a beaker on a hot plate in an argon glove box. Different ethoxylated aromatic species may be readily synthesized using known ethoxylation procedures and similarly reacted with phosphorus pentoxide.

A 3%, slightly alkaline solution of the orange, viscous product was made for addition to zinc anodes. Advantageously, the material demonstrated greater water solubility than the polyoxyethylene dinonylphenyl ether phosphate typically used in anode compositions.

The surfactant was analyzed and characterized by 1H and 31P NMR. The degree of ethoxylation was determined by setting the integral reference for the aromatic region of the 1H NMR spectrum and dividing the sum of the region from 3.2 to 4.2 ppm by 4. The degree of ethoxylation was determined to be 14. The mol % of each phosphorus species was determined by integrating the peak areas of the 31P NMR collected using inverse-gated decoupling. 31P NMR analysis demonstrated that the surfactant included 75 mol % of the phosphate monoester, 18 mol % of the phosphate diester, with 7% residual phosphoric acid.

Example 2

AA batteries having identical components except the surfactant composition of the anode were prepared. Surfactant concentration in the anode compositions are reported relative to zinc metal particle weight. Anode compositions were made using the surfactant synthesized in Example 1, at different concentrations, and the assembled batteries were compared with a comparative battery example comprising an anode composition including polyoxyethylene dinonylphenyl ether phosphate, which, as described above, is a surfactant conventionally used in anode compositions in commercially available batteries. The batteries were stored at room temperature, and then tested for Performance, as described above. One cell was tested per group. The results are shown in Table 1, below.

TABLE 1

| Performance Testing | | | | | |
|---|---|---|---|---|---|
| | Example | | | | |
| | Example A | Example B | Example C | Comparative Example D | Control |
| Surfactant Concentration | 40 ppm | 36 ppm | 32 ppm | 150 ppm | 0 |
| Test: Digicam (Pulses to 1.05 V) | 157 | 160 | 157 | 158 | 186 |
| Test: Toy Test (modified 12 hr rest, Service Hours to 0.8 V) | 7.49 | 7.47 | 7.51 | 7.5 | 6.72 |
| Test: 3.9 ohm Continuous (Service Hours to 0.8 V) | 5.72 | 5.39 | 5.45 | 5.68 | 3.94 |

Example 2 shows that compared to Comparative Example D, battery Examples A, B, and C according to the invention demonstrated comparable Digicam, Fast Toy, and continuous discharge results suggesting that that the amount of zinc surface coverage provided by the surfactant of the disclosure is comparable to the surface coverage provided by the commercial, comparative surfactant, despite including significantly and surprisingly lower surfactant concentrations. These results surprisingly demonstrate similar battery performance at levels approaching 20% relative to the amount of surfactant used in the comparative example. Therefore, Example 2 shows that batteries of the disclosure including anodes comprising a surfactant according to the disclosure perform at least as well as the comparative battery, while including significantly less surfactant than the comparative battery, and without including nonylphenol functional groups.

Because the surfactant of the disclosure can advantageously coat the surface of the anode using substantially less surfactant than needed with the commercial surfactants, there is less surfactant on the surface of the anode that must be removed to allow the discharge reaction to proceed. Without intending to be bound by theory, it is believed that the surfactants of the disclosure have greater solubility in an alkaline electrolyte than the commercial surfactants. As a result, advantageously less energy is required to remove the surfactant of the disclosure from the anode surface.

Example 3

AA batteries having identical components except the surfactant composition of the anode were prepared. Surfactant concentration in the anode compositions are reported relative to zinc metal particle weight. One anode composition was made using the surfactant synthesized in Example 1, and the assembled batteries were compared with a comparative battery example comprising an anode composition including polyoxyethylene dinonylphenyl ether phosphate, which, as described above, is a surfactant conventionally used in anode compositions in commercially available batteries. The batteries were stored at room temperature, and then tested for Performance, as described above. Two cells were tested per group and the averages are reported below. The results are shown in Table 2, below.

TABLE 2

| Performance Testing | | |
|---|---|---|
| | Example | |
| | Example E | Comparative Example F |
| Surfactant Concentration | 32 ppm | 150 ppm |
| Test: Digicam (Pulses to 1.05 V) | 187 | 188 |
| Test: Toy Test (23 hr rest, Service Hours to 0.8 V) | 8.0 | 8.1 |
| Test: Pulse Load Voltage (80 mV one second pulse) | 1.56 | 1.55 |

Example 3 shows that compared to Comparative Battery Example F, Battery Examples E demonstrated comparable Digicam, Fast Toy, and Pulse Load Voltage results suggesting that that the amount of zinc surface coverage provided by the surfactant of the disclosure is comparable to the surface coverage provided by the commercial, comparative surfactant, despite being incorporated at a significantly and surprisingly lower surfactant concentration. Similar to the results shown in Example 2, these results surprisingly demonstrate similar battery performance at levels approaching 20% relative to the amount of surfactant used in the corresponding comparative example. Therefore, Example 3 further corroborates that batteries of the disclosure including anodes comprising a surfactant according to the disclosure perform at least as well as the comparative battery, while including significantly less surfactant than the comparative battery.

Example 4

AA batteries having identical components except the surfactant composition of the anode were prepared. In this Example, batteries comprising an anode composition comprising a surfactant according to the invention are compared with batteries comprising an anode not including a surfactant.

Figure 2:
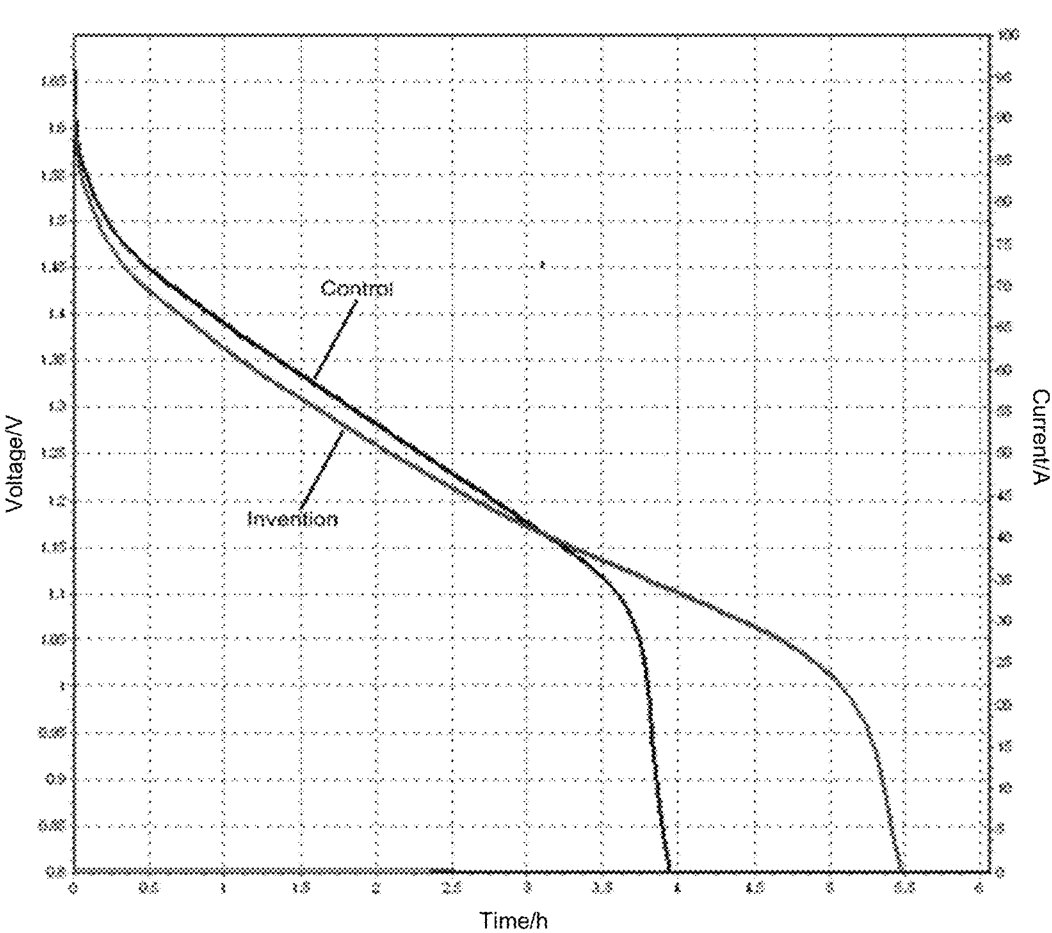
FIG. 2 is a continuous cell discharge curve showing voltage vs. time for a battery comprising an anode including a surfactant according to the invention and a control battery comprising an anode not including a surfactant.

FIG. 2 shows a continuous discharge at 3.9 ohms for AA cells comprising an anode with no surfactant additive relative to a AA cells comprising an anode including a surfactant according to the invention, specifically, the ethoxylated naphthol phosphate prepared according to Example 1. FIG. 2 shows that AA cells comprising the anode without surfactant additive underwent premature polarization relative to AA cells comprising an anode including a surfactant according to the invention.

Figure 3:
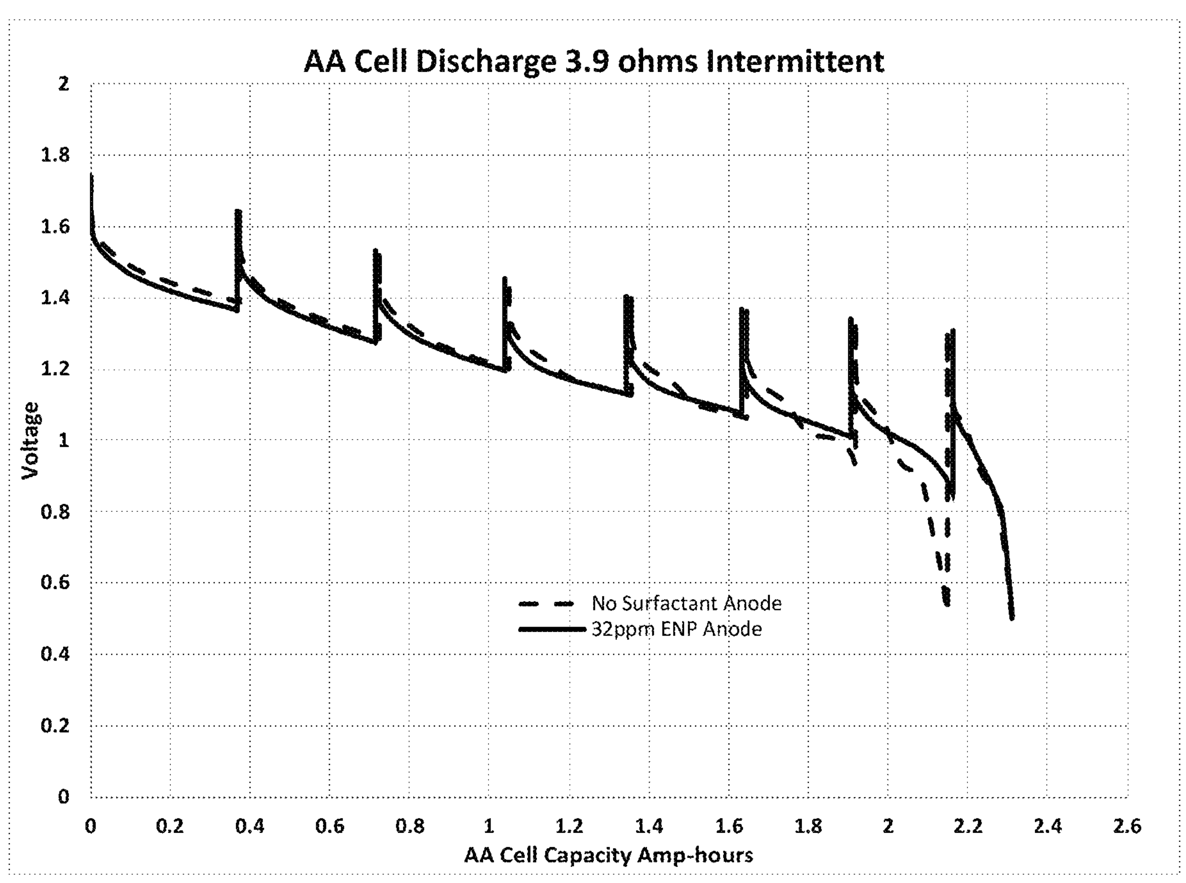
FIG. 3 is an intermittent pulse cell discharge curve showing voltage vs. capacity for a battery comprising an anode including a surfactant according to the invention and a control battery comprising an anode not including a surfactant.

FIG. 3 shows an intermittent discharge for AA cells comprising an anode with no additive relative to a AA cells comprising an anode including a surfactant according to the invention, specifically, the ethoxylated naphthol phosphate prepared according to Example 1. FIG. 3 shows that AA cells comprising an anode including a surfactant according to the invention demonstrated greater capacity relative to AA cells comprising the anode without surfactant additive.

The foregoing description is given for clearness of understanding only, and no unnecessary limitations should be understood therefrom, as modifications within the scope of the disclosure may be apparent to those having ordinary skill in the art.

All patents, publications, and references cited herein are hereby fully incorporated by reference. In case of a conflict between the present disclosure and incorporated patents, publications, and references, the present disclosure should control.

What is claimed:

1. An anode composition comprising:

zinc or a zinc alloy; and a surfactant of formula (I):

(I)

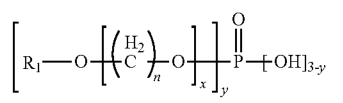

wherein R1 comprises one or more aryl groups chosen from naphthyl, fluorenyl, anthracenyl, phenanthryl, tetracenyl, benz[a]anthracenyl, pyrenyl, and perylenyl;

y is 1 or 2;

x is an integer from 2 to 30; and n is an integer from 2 to 6.

2. The anode composition of claim 1, wherein n is an integer from 2 to 3.

3. The anode composition claim 1, wherein n is 2.

4. The anode composition of claim 1, wherein n is 3.

5. The anode composition of claim 1, wherein the surfactant of formula (I) comprises a mixture of surfactants of formula (I).

6. The anode composition of claim 1, wherein the surfactant of formula (I) comprises a mixture of phosphate monoester and phosphate diester surfactants according to formula (I).

7. The anode composition of claim 1, the anode composition being free of nonylphenol functional groups.

8. The anode composition of claim 5, wherein for the mixture of surfactants of formula (I), the average x is an integer from 6 to 16.

9. The anode composition of claim 1, wherein R1 is 2-napthyl.

10. The anode composition of claim 1, wherein the surfactant according to formula (I) is provided in an amount of about 10 ppm to about 75 ppm, relative to the amount of zinc or zinc alloy.

11. An alkaline battery comprising:

an anode comprising an anode composition according to claim 1;

a cathode;

a separator therebetween the anode and the cathode; and an alkaline electrolyte.

12. The battery according to claim 11, wherein the alkaline electrolyte comprises hydroxide in an amount between about 25 weight percent (wt. %) and about 40 wt. %, based on the weight of the electrolyte in the battery.

13. The battery according to claim 11 or claim 12, wherein the cathode comprises one or more manganese oxides.

14. The battery according to claim 11, wherein the cathode comprises one or more electrochemically active cathode materials chosen from one or more in the group of silver oxide, nickel oxide, silver nickel oxide, nickel oxyhydroxide, copper oxide, silver copper oxide, bismuth oxide, high-valence nickel, and alloys thereof.

15. The battery according to claim 14, wherein the cathode comprises one or more nickel oxides chosen from one or more in the group of nickel hydroxide, nickel oxyhydroxide, cobalt oxyhydroxide-coated nickel oxyhydroxide, delithiated layered lithium nickel oxide, partially delithiated layered lithium nickel oxide, and combinations thereof.

16. A method of making a battery, comprising:

incorporating into a battery an anode including a zinc or a zinc alloy and a surfactant of formula (I):

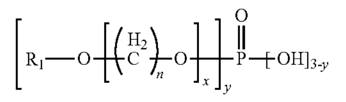

wherein R1 is selected from one or more aryl groups chosen from naphthyl, fluorenyl, anthracenyl, phenanthryl, tetracenyl, benz[a]anthracenyl, pyrenyl, and perylenyl;

y is 1 or 2;

x is an integer from 2 to 30; and n is an integer from 2 to 6.

17. The method of claim 16, wherein the surfactant according to formula (I) is provided in an amount in a range of between about 10 ppm to about 75 ppm, relative to the amount of zinc or zinc alloy in the anode composition.

18. An anode composition comprising:

zinc or a zinc alloy; and a surfactant of formula (II):

(II)

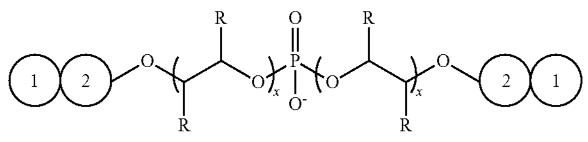

wherein R is methyl or hydrogen;

x is an integer from 2 to 30; and the rings 1 and 2 represent a coupled ring system comprising at least 10 ring carbons.

19. The anode composition of claim 18, wherein the coupled ring system comprises naphthyl, fluorenyl, anthracenyl, phenanthryl, tetracenyl, benz[a]anthracenyl, pyrenyl, perylenyl, biphenyl, or bicyclohexyl.

* * * * *